(12) United States Patent
Ni et al.

(10) Patent No.: US 9,981,742 B2
(45) Date of Patent: May 29, 2018

(54) AUTONOMOUS NAVIGATION METHOD AND SYSTEM, AND MAP MODELING METHOD AND SYSTEM

(71) Applicant: BAIDU ONLINE NETWORK TECHNOLOGY (BEIJING) CO., LTD., Beijing (CN)

(72) Inventors: Kai Ni, Beijing (CN); Yanke Wang, Beijing (CN); Liang Wang, Beijing (CN); Ji Tao, Beijing (CN); Kai Yu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days. days.

(21) Appl. No.: 14/897,606

(22) PCT Filed: Dec. 10, 2014

(86) PCT No.: PCT/CN2014/093519
§ 371 (c)(1),
(2) Date: Dec. 10, 2015

(87) PCT Pub. No.: WO2015/165266
PCT Pub. Date: Nov. 5, 2015

(65) Prior Publication Data
US 2017/0305546 A1    Oct. 26, 2017

(30) Foreign Application Priority Data
Apr. 29, 2014    (CN) .......................... 2014 1 0177990

(51) Int. Cl.
G06K 9/00    (2006.01)
B64C 39/02    (2006.01)
(Continued)

(52) U.S. Cl.
CPC ......... B64C 39/024 (2013.01); G05D 1/0094 (2013.01); G05D 1/101 (2013.01);
(Continued)

(58) Field of Classification Search
None
See application file for complete search history.

(56) References Cited

U.S. PATENT DOCUMENTS 8,965,598 B2 *  2/2015  Kruglick ............... B64C 39/024
                                                                244/75.1
9,352,833 B2 *  5/2016  Kruglick ............... B64C 39/024
(Continued)

FOREIGN PATENT DOCUMENTS

| CN | 102435188 | 5/2012 |
| CN | 102788580 | 11/2012 |
| CN | 103196430 | 7/2013 |

OTHER PUBLICATIONS

Ni, et al., Overview on Indoor Mav Autonomous Navigation and Guidance Technologies Based on Onboard Sensors, Computer Applications and Software, vol. 29, No. 8, pp. 160-163 Aug. 31, 2012.
(Continued)

*Primary Examiner* — Randolph I Chu
(74) *Attorney, Agent, or Firm* — Hodgson Russ LLP

(57) ABSTRACT

The present disclosure provides an autonomous navigation method and system, and a map modeling method and system. The autonomous navigation method comprises: controlling an unmanned aerial vehicle to take off, and collecting videos of a scene corresponding to the unmanned aerial vehicle at each collection time point; obtaining feature points in the videos of the scene corresponding to each collection time point; generating a flight path of the unmanned aerial vehicle according to the feature points in the videos of the scene corresponding to each collection time
(Continued)

point; generating a first map model according to the flight path of the unmanned aerial vehicle and the videos of the scene corresponding to each collection time point; and carrying out autonomous navigation on the unmanned aerial vehicle according to the first map model.

14 Claims, 6 Drawing Sheets

(51) Int. Cl.
  *G08G 5/00*    (2006.01)
  *G05D 1/10*    (2006.01)
  *G05D 1/00*    (2006.01)
  *G06T 17/05*    (2011.01)

(52) U.S. Cl.
  CPC ........... *G06T 17/05* (2013.01); *G08G 5/0034* (2013.01); *G08G 5/0069* (2013.01); *B64C 2201/127* (2013.01); *B64C 2201/141* (2013.01)

(56) References Cited

U.S. PATENT DOCUMENTS

2009/0248304 A1  10/2009 Roumeliotis et al.
2017/0212529 A1*  7/2017 Kumar ................... G05D 1/102

OTHER PUBLICATIONS

ISA/CN, International Search Report for PCT/CN2014/093519 dated Mar. 18, 2015.

* cited by examiner

AUTONOMOUS NAVIGATION METHOD AND SYSTEM, AND MAP MODELING METHOD AND SYSTEM

CROSS REFERENCE TO RELATED APPLICATION

This application is a national phase entry under 35 USC § 371 of International Application PCT/CN2014/093519, filed Dec. 10, 2014, which claims priority to and benefits of Chinese Patent Application No. 201410177990.6, filed with the State Intellectual Property Office of P.R. China on Apr. 29, 2014, the entire contents of which are incorporated herein by reference.

FIELD

The present disclosure generally relates to the navigation technology field, and more particularly, to an autonomous navigation method and an autonomous navigation system, and a method and a system for establishing a map model.

BACKGROUND

In the autonomous navigation technology, the scene where the unmanned aerial vehicle flies over is surveilled by sensors in the unmanned aerial vehicle, and then the unmanned aerial vehicle accomplishes autonomous localization and flight path analysis according to the surveillance result. Therefore, this technology is widely used in the military and scientific research fields. Nowadays, with the popularization of low-cost sensors and the improvement of embedded computing technology, the autonomous navigation technology is gradually extended to the civil and commercial fields from the military and scientific research fields. However, in the indoor scenarios, there are still two problems existing in the autonomous navigation technology in the related art.

Firstly, the unmanned aerial vehicle in the related art accomplishes its own spatial positioning in the scene by using mainly the GPS positioning technology. However, in the complex indoor scene, the unmanned aerial vehicle cannot effectively use the GPS positioning technology for the spatial positioning because of the influence of factors such as the building blocking, which makes the unmanned aerial vehicle not able to effectively carry out the autonomous navigation flight in the complex indoor scene.

Secondly, in the complex indoor scene, the autonomous navigation technology requires the environment map with greater precision. However, the SLAM algorithm in the related art can only establish the sparse map model with an error less than 5% of the whole environment scale. Meanwhile, the laser scanning system which may establish the high precision map model with an error less than 1% of the whole environment scale is not suitable for the unmanned aerial vehicle which flies in the inner environment. Therefore, there is also a need to improve the method for establishing the high precision map model in the indoor environment.

SUMMARY

The present disclosure aims to solve at least one of the above problems in the related art to at least some extent.

Accordingly, objectives of embodiments of the present disclosure are to provide an autonomous navigation method and an autonomous navigation system of an unmanned aerial vehicle flying in the indoor environment, and a method and a system for establishing a map model with a high precision.

A first aspect of embodiments of the present disclosure provides an autonomous navigation method, including: controlling the unmanned aerial vehicle to take off and collecting videos of a scene corresponding to the unmanned aerial vehicle at each collection time point; obtaining feature points in the videos of the scene corresponding to each collection time point; generating a flight path of the unmanned aerial vehicle according to the feature points in the videos of the scene corresponding to each collection time point; generating a first map model according to the flight path of the unmanned aerial vehicle and the videos of the scene corresponding to each collection time point; and carrying out autonomous navigation on the unmanned aerial vehicle according to the first map model.

In this embodiment of the present disclosure, by collecting the videos of the scene corresponding to the unmanned aerial vehicle collected at each collection time point, and analyzing and identifying the videos, the unmanned aerial vehicle may carry out the autonomous navigation in the indoor environment.

In a particular embodiment of the present disclosure, carrying out autonomous navigation on the unmanned aerial vehicle according to the first map model includes: obtaining a current location of the unmanned aerial vehicle according to the first map model; obtaining regions where the unmanned aerial vehicle has not flied over in the scene according to the current location and a takeoff location of the unmanned aerial vehicle; generating a target location according to the first map model and the regions where the unmanned aerial vehicle has not flied over in the scene; generating a navigation path according to the target location and the first map model, and controlling the unmanned aerial vehicle to fly according to the navigation path.

Furthermore, in a particular embodiment of the present disclosure, generating a flight path of the unmanned aerial vehicle according to the feature points in the videos of the scene corresponding to each collection time point includes: setting the takeoff location of the unmanned aerial vehicle as an initial coordinate; generating each location coordinate of the unmanned aerial vehicle at each collection time point by comparing the feature points in the videos of the scene corresponding to each collection time point and using the initial coordinate as a reference; generating the flight path of the unmanned aerial vehicle according to each location coordinate and the initial coordinate.

Preferably, in the autonomous navigation method according to an embodiment of the present disclosure, controlling the unmanned aerial vehicle to take off includes: controlling the unmanned aerial vehicle to take off in a manual control mode if the unmanned aerial vehicle has a monocular camera; controlling the unmanned aerial vehicle to take off in an autonomous control mode if the unmanned aerial vehicle has a stereo camera.

A second aspect of embodiments of the present disclosure provides a method for establishing a map model, including: controlling an unmanned aerial vehicle to take off; collecting videos of a scene corresponding to the unmanned aerial vehicle at each collection time point, and performing a laser scanning on the scene to obtain laser scanning data of the scene corresponding to each collection time point; recording flight attitude parameters of the unmanned aerial vehicle at each collection time point; obtaining feature points in the videos of the scene corresponding to each collection time point; generating a flight path of the unmanned aerial vehicle according to the feature points in the videos of the scene corresponding to each collection time point; generating a first map model according to the flight path of the unmanned aerial vehicle and the videos of the scene corresponding to each collection time point; and generating a second map model according to the flight attitude parameters, the first map model and the laser scanning data.

In this embodiment of the present disclosure, the first map model of the scene is obtained by controlling the unmanned aerial vehicle to fly in the autonomous mode, and the laser scanning data is obtained by performing the laser scanning on the scene, such that the second map model is generated according to the laser scanning data and the first map model, thus establishing the map model with the high precision.

Furthermore, in this embodiment of the present disclosure, a precision of the second map model is higher than that of the first map model.

In a particular embodiment of the present disclosure, generating a flight path of the unmanned aerial vehicle according to the feature points in the videos of the scene corresponding to each collection time point includes: setting a takeoff location of the unmanned aerial vehicle as an initial coordinate; generating each location coordinate of the unmanned aerial vehicle at each collection time point by comparing the feature points in the videos of the scene corresponding to each collection time point and using the initial coordinate as a reference; and generating the flight path of the unmanned aerial vehicle according to each location coordinate and the initial coordinate.

Preferably, in the method for establishing a map model according to an embodiment of the present disclosure, controlling the unmanned aerial vehicle to take off includes: controlling the unmanned aerial vehicle to take off in a manual control mode if the unmanned aerial vehicle has a monocular camera; controlling the unmanned aerial vehicle to take off in an autonomous control mode if the unmanned aerial vehicle has a stereo camera.

Furthermore, in a particular embodiment of the present disclosure, generating a second map model according to the flight attitude parameters, the first map model and the laser scanning data includes: sending the flight attitude parameters, the first map model and the laser scanning data to a server; splicing the first map model and the laser scanning data according to the flight attitude parameters, and generating point cloud data of the scene corresponding to each collection time point; and generating the second map model of the scene according to the point cloud data.

A third aspect of embodiments of the present disclosure provides an autonomous navigation system of an unmanned aerial vehicle, including: a camera, disposed on the unmanned aerial vehicle and configured to collect videos of a scene corresponding to the unmanned aerial vehicle at each collection time point; a first model establishing device, configured to obtain feature points in the videos of the scene corresponding to each collection time point, to generate a flight path of the unmanned aerial vehicle according to the feature points, and to generate a first map model according to the flight path and the videos of the scene corresponding to each collection time point; and an autonomous navigation device, configured to carry out autonomous navigation on the unmanned aerial vehicle according to the first map model.

In this embodiment of the present disclosure, by collecting the videos of the scene corresponding to the unmanned aerial vehicle collected at each collection time point, and analyzing and identifying the videos, the unmanned aerial vehicle may carry out the autonomous navigation in the indoor environment.

In a particular embodiment of the present disclosure, the autonomous navigation device includes: a current location obtaining module, configured to obtain a current location of the unmanned aerial vehicle according to the first map model; a target location generating module, configured to obtain regions where the unmanned aerial vehicle has not flied over in the scene according to the current location and a takeoff location of the unmanned aerial vehicle, and to generate a target location according to the first map model and the regions where the unmanned aerial vehicle has not flied over in the scene; a flight control module, configured to generate a navigation path according to the target location and the first map model, and to control the unmanned aerial vehicle to fly according to the navigation path.

Furthermore, in a particular embodiment of the present disclosure, the first model establishing device includes: a feature point obtaining module, configured to obtain the feature points in the videos of the scene corresponding to each collection time point; a flight path generating module, configured to generate the flight path of the unmanned aerial vehicle according to the feature points in the videos of the scene corresponding to each collection time point; a first map model generating module, configured to generate the first map model according to the flight path and the videos of the scene corresponding to each collection time point.

A fourth aspect of embodiments of the present disclosure provides a system for establishing a map model, including: an unmanned aerial vehicle, a first model establishing device and a server. The unmanned aerial vehicle includes: a camera, disposed on the unmanned aerial vehicle and configured to collect videos of a scene corresponding to the unmanned aerial vehicle at each collection time point; a laser scanner, disposed on the unmanned aerial vehicle and configured to perform a laser scanning on the scene corresponding to the unmanned aerial vehicle at each collection time point; a flight attitude recording device, disposed on the unmanned aerial vehicle and configured to record flight attitude parameters of the unmanned aerial vehicle at each collection time point. The first model establishing device is connected to the unmanned aerial vehicle and configured to obtain feature points in the videos of the scene corresponding to each collection time point, to generate a flight path of the unmanned aerial vehicle according to the feature points in the videos of the scene corresponding to each collection time point, and to generate a first map model according to the flight path of the unmanned aerial vehicle and the videos of the scene corresponding to each collection time point. The server is configured to communicate with the unmanned aerial vehicle, and to generate a second map model according to the flight attitude parameters, the first map model and the laser scanning data.

In this embodiment of the present disclosure, the first map model of the scene is obtained by controlling the unmanned aerial vehicle to fly in the autonomous mode, and the laser scanning data is obtained by performing the laser scanning on the scene, such that the second map model is generated according to the laser scanning data and the first map model, thus establishing the map model with the high precision.

Furthermore, in this embodiment of the present disclosure, a precision of the first map model is lower than that of the second map model.

In a particular embodiment of the present disclosure, the first model establishing device specifically includes: a feature point obtaining module, configured to obtain the feature points in the videos of the scene corresponding to each collection time point; a flight path generating module, configured to generate the flight path of the unmanned aerial vehicle according to the feature points in the videos of the scene corresponding to each collection time point; a first map model generating module, configured to generate the first map model according to the flight path and the videos of the scene corresponding to each collection time point.

Furthermore, in a particular embodiment of the present disclosure, the server specifically includes a communication module and a data processing module, in which the communication module is configured to receive the flight attitude parameters, the first map model and the laser scanning data sent by the unmanned aerial vehicle; the data processing module is configured to splice the first map model and the laser scanning data according to the flight attitude parameters, to generate point cloud data of the scene corresponding to each collection time point, and to generate the second map model of the scene according to the point cloud data.

A fifth aspect of embodiments of the present disclosure provides a system, including: one or more processors; a memory; and one or more modules, in which the one or more modules are stored in the memory, and when executed by the one or more processors, causes the one or more processors to perform following operations: controlling the unmanned aerial vehicle to take off and collecting videos of a scene corresponding to the unmanned aerial vehicle at each collection time point; obtaining feature points in the videos of the scene corresponding to each collection time point; generating a flight path of the unmanned aerial vehicle according to the feature points in the videos of the scene corresponding to each collection time point; generating a first map model according to the flight path of the unmanned aerial vehicle and the videos of the scene corresponding to each collection time point; and carrying out autonomous navigation on the unmanned aerial vehicle according to the first map model.

A sixth aspect of embodiments of the present disclosure provides a system, including: one or more processors; a memory; and one or more modules, in which the one or more modules are stored in the memory, and when executed by the one or more processors, causes the one or more processors to perform following operations: controlling an unmanned aerial vehicle to take off; collecting videos of a scene corresponding to the unmanned aerial vehicle at each collection time point, and performing a laser scanning on the scene to obtain laser scanning data of the scene corresponding to each collection time point; recording flight attitude parameters of the unmanned aerial vehicle at each collection time point; obtaining feature points in the videos of the scene corresponding to each collection time point; generating a flight path of the unmanned aerial vehicle according to the feature points in the videos of the scene corresponding to each collection time point; generating a first map model according to the flight path of the unmanned aerial vehicle and the videos of the scene corresponding to each collection time point; and generating a second map model according to the flight attitude parameters, the first map model and the laser scanning data.

DETAILED DESCRIPTION

Figure 1:
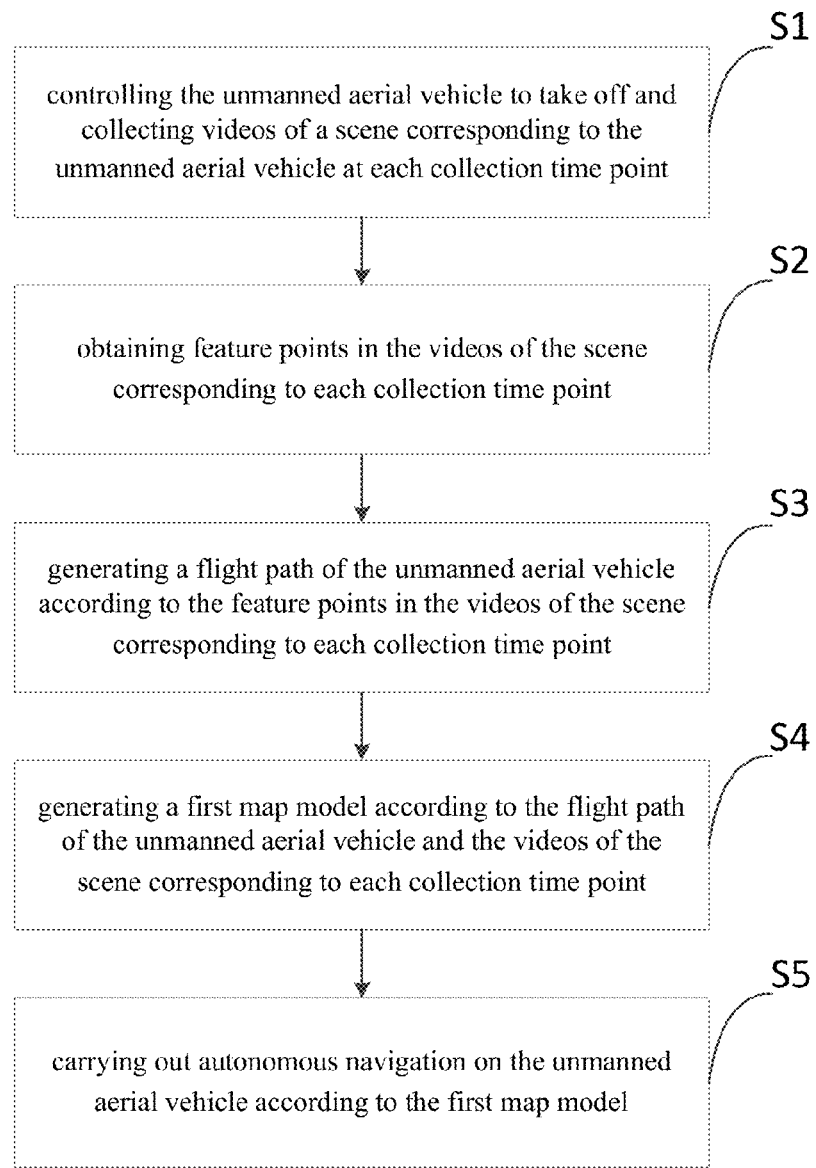
FIG. 1 is a flow chart showing an autonomous navigation method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the specification, unless specified or limited otherwise, relative terms such as "central", "longitudinal", "lateral", "length", "width", "thickness", "above", "below", "front", "rear", "right", "left", "horizontal", "vertical", "top", "bottom", "inner", "outer", "clockwise", "counterclockwise" as well as derivative thereof should be construed to refer to the orientation as then described or as shown in the drawings under discussion. These relative terms are for convenience of description and do not require that the present disclosure be constructed or operated in a particular orientation.

In the description of the present disclosure, it should be understood that, terms such as "first" and "second" are used herein for purposes of description and are not intended to indicate or imply relative importance or significance. In the description of the present disclosure, "a plurality of" means two or more than two, unless specified otherwise.

In the description of the present disclosure, it should be noted that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless specified otherwise. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

In the following, an autonomous navigation method and an autonomous navigation system of an unmanned aerial vehicle and a method and a system for establishing a map model with the high precision according to embodiments of the present disclosure will be described in detail with reference to the drawings.

FIG. 1 is a flow chart showing an autonomous navigation method according to an embodiment of the present disclosure. As shown in FIG. 1, the autonomous navigation method according to an embodiment of the present disclosure includes following steps.

In step S1, the unmanned aerial vehicle is controlled to take off and videos of a scene corresponding to the unmanned aerial vehicle are collected at each collection time point. Preferably, in an embodiment of the present disclosure, the unmanned aerial vehicle is controlled to take off in a manual control mode and to switch into an autonomous flight mode after flying for a period of time, if the unmanned aerial vehicle has a monocular camera; the unmanned aerial vehicle is controlled to take off in the autonomous flight mode if the unmanned aerial vehicle has a stereo camera.

In step S2, feature points in the videos of the scene corresponding to each collection time point are obtained. In an embodiment of the present disclosure, a variety of algorithms may be used to extract the feature points from the videos of the scene corresponding to each collection time point. For example, the algorithms include FAST (Features from Accelerated Segment Test) algorithm, and SIFT (Scale Invariant Feature Transform) algorithm. It should be noted that, the two algorithms described above only are specific examples; other algorithms may also be adopted to obtain the feature points. For example, if there are objects such as walls, tables in the scene, these objects may be extracted as the feature points by the algorithms described above.

In step S3, a flight path of the unmanned aerial vehicle is generated according to the feature points in the videos of the scene corresponding to each collection time point. Preferably, in an embodiment of the present disclosure, a collection frequency of collecting the videos of the scene corresponding to unmanned aerial vehicle at each collection time point may be in a range from 20 frames per second to 40 frames per second.

In step S4, a first map model is generated according to the flight path of the unmanned aerial vehicle and the videos of the scene corresponding to each collection time point. In an embodiment of the present disclosure, SLAM (Simultaneous Localization and Mapping) algorithm is used to splice each location coordinate and the initial coordinate for generating the flight path. Each point in the flight path has the corresponding video of the scene, and in the videos of the scene corresponding to different points, the objects in the scene will appear with different perspectives in the videos of the scene, such that three-dimensional models of the objects in the scene may be generated perfectly according to the video images of the objects in different perspectives, and thus the first map model is established.

In step S5, autonomous navigation is carried out on the unmanned aerial vehicle according to the first map model.

In this embodiment of the present disclosure, by collecting the videos of the scene corresponding to the unmanned aerial vehicle collected at each collection time point, and analyzing and identifying the videos, the unmanned aerial vehicle may carry out the autonomous navigation in the indoor environment.

Figure 2:
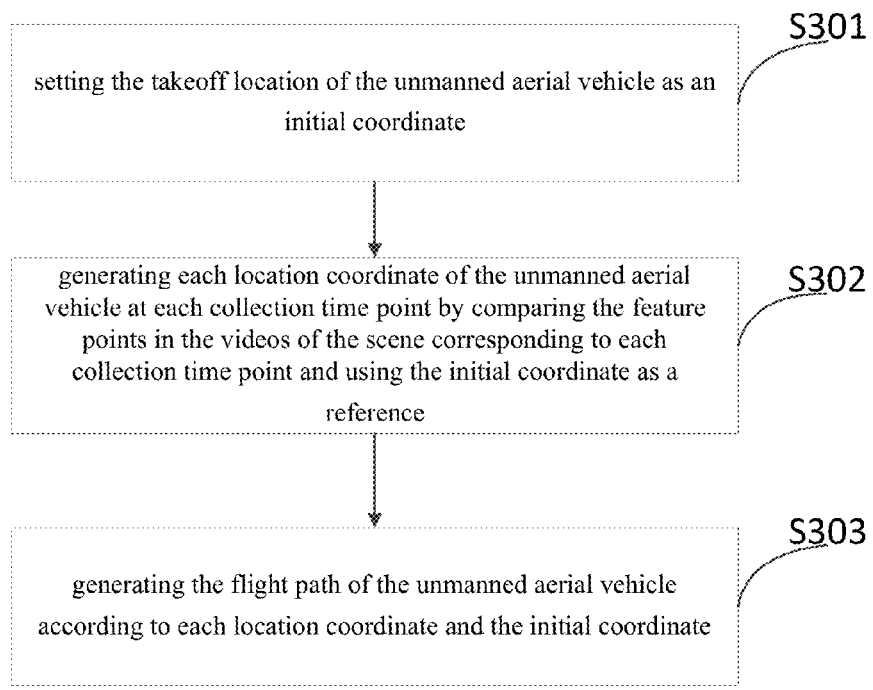
FIG. 2 is a flow chart showing obtaining feature points in videos of the scene corresponding to each collection time point in an autonomous navigation method according to an embodiment of the present disclosure.

FIG. 2 is a flow chart showing obtaining feature points in the videos of the scene corresponding to each collection time point in an autonomous navigation method according to an embodiment of the present disclosure.

As shown in FIG. 2, step S3 includes following steps.

In step S301, a takeoff location of the unmanned aerial vehicle is set as an initial coordinate. In an embodiment of the present disclosure, the takeoff location of the unmanned aerial vehicle is a three-dimensional coordinate, for example, the value of which may be (0, 0, 0).

In step S302, each location coordinate of the unmanned aerial vehicle at each collection time point is generated by comparing the feature points in the videos of the scene corresponding to each collection time point and using the initial coordinate as a reference. Since the initial coordinate is the three-dimensional coordinate, each location coordinate with respect to the initial coordinate is also the three-dimensional coordinate.

Meanwhile, these three-dimensional coordinates will have two-dimensional projection locations in each image of the corresponding video. By using the feature points in the videos of the scene corresponding to each collection time point as the reference objects and comparing location changes between two-dimensional projection locations of respective location coordinates, each location coordinate of the unmanned aerial vehicle at each collection time point may be generated by using the initial coordinate as a reference. Since the unmanned aerial vehicle will fly over the whole scene, the coordinate of each object in the scene may be obtained according to the coordinate of each point in the flight path of the unmanned aerial vehicle.

In an embodiment of the present disclosure, the unmanned aerial vehicle is placed in the office building. The stereo cameras are mounted in the unmanned aerial vehicle. The unmanned aerial vehicle is controlled automatically to take off according to video shooting results of the stereo cameras, and during the flying, real-time video images within the office building may be shot using the stereo cameras. The feature points, for example, geometric corners and texture blocks of the walls, tables and chairs, stairs in the office building, may be extracted from the real-time video images. The takeoff location of the unmanned aerial vehicle is set as the initial coordinate (0, 0, 0), and then the three-dimensional coordinate of each location where the unmanned aerial vehicle flies over may be obtained according to the initial coordinate by using the feature points as the reference points and comparing the locations of the unmanned aerial vehicle at different time. The autonomous navigation device determines regions where the unmanned aerial vehicle has not flied over according to the takeoff location and each location where the unmanned aerial vehicle flies over, and plans the corresponding flight path, such that the unmanned aerial vehicle flies across all regions of the office building, that is, each location in the office building is corresponding to the three-dimensional coordinate of one location in the flight process of the unmanned aerial vehicle. Therefore, after the unmanned aerial vehicle files across all regions in the office building, the three-dimensional coordinates of the feature points in the videos of the scene corresponding to each collection time point are obtained. Then, the first map model of the official building may be generated according to the three-dimensional coordinates of the feature points in the videos of the scene corresponding to each collection time point.

In step S303, the flight path of the unmanned aerial vehicle is generated according to each location coordinate and the initial coordinate. Preferably, in an embodiment of the present disclosure, the three-dimensional coordinates of the feature points in the videos of the scene corresponding to each collection time point may be calculated by SFM (Structure-from-Motion) algorithm.

Figure 3:
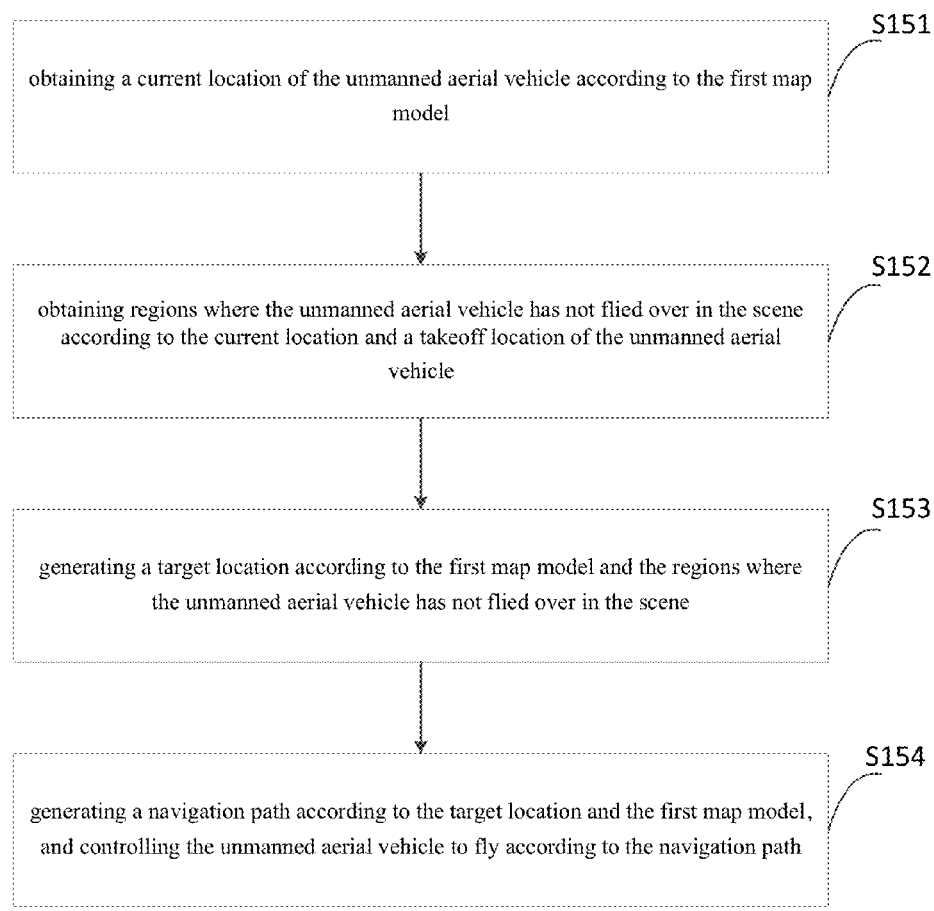
FIG. 3 is a flow chart showing carrying out autonomous navigation on the unmanned aerial vehicle according to the first map model in an autonomous navigation method according to an embodiment of the present disclosure.

FIG. 3 is a flow chart showing carrying out autonomous navigation on the unmanned aerial vehicle according to the first map model in an autonomous navigation method according to an embodiment of the present disclosure.

As shown in FIG. 3, step S5 includes following steps.

In step S151, a current location of the unmanned aerial vehicle is obtained according to the first map model.

In step S152, regions where the unmanned aerial vehicle has not flied over in the scene are obtained according to the current location and a takeoff location of the unmanned aerial vehicle.

In step S153, a target location is generated according to the first map model and the regions where the unmanned aerial vehicle has not flied over in the scene. In an embodiment of the present disclosure, the target location generated according to the regions where the unmanned aerial vehicle has not flied over has such characteristics that the unmanned aerial vehicle may fly over all the regions where the unmanned aerial vehicle has not flied over from the current location to the target location.

In step S154, a navigation path is generated according to the target location and the first map model, and the unmanned aerial vehicle is controlled to fly according to the navigation path. When the autonomous navigation method according to an embodiment of the present disclosure is used to control flying of the unmanned aerial vehicle, the unmanned aerial vehicle calculates its surrounding border regions using the first map model generated in real-time, and then selects the regions not belonging to the border regions for flying over.

Figure 4:
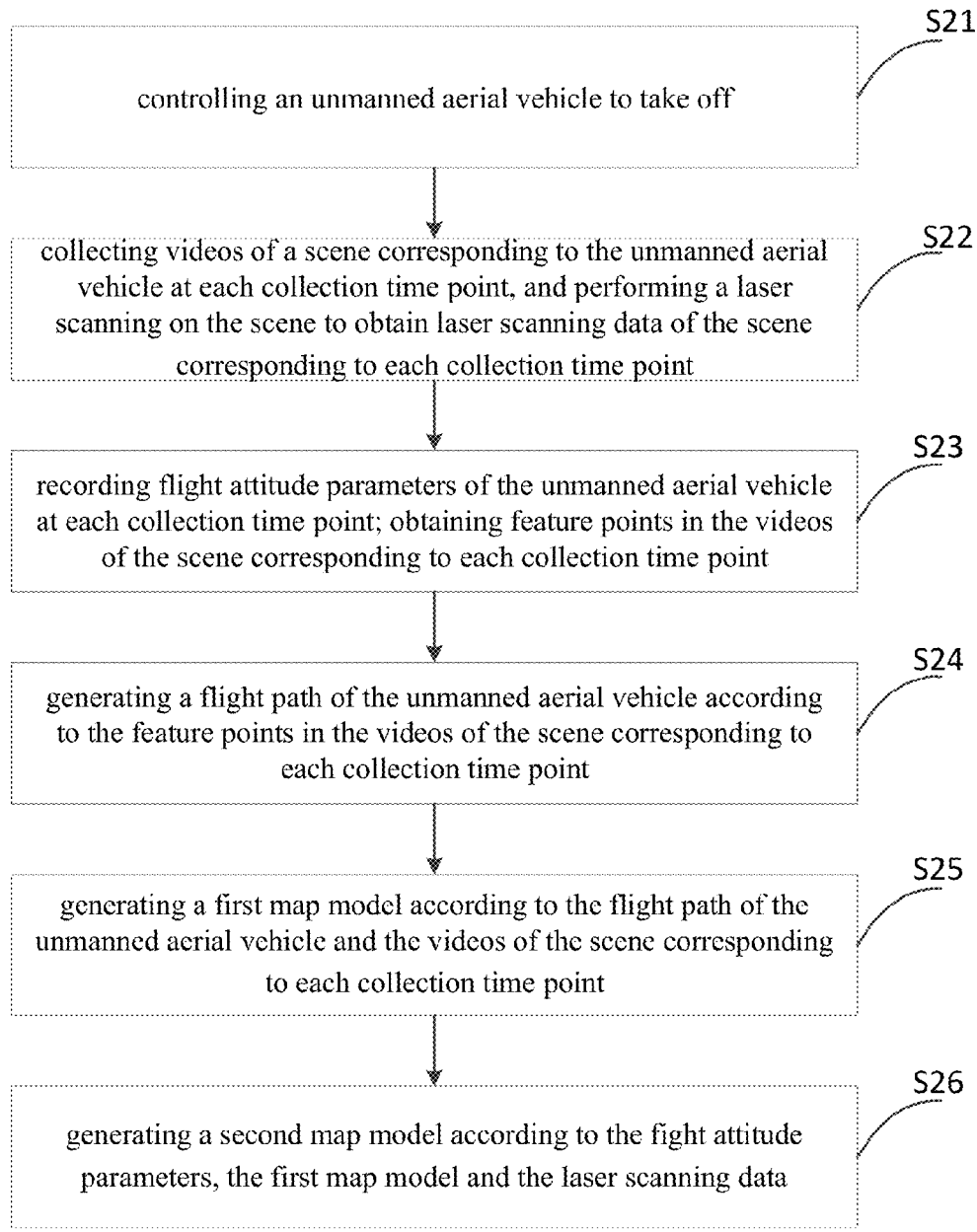
FIG. 4 is a flow chart showing a method for establishing a map model according to an embodiment of the present disclosure.

FIG. 4 is a flow chart showing a method for establishing a map model according to an embodiment of the present disclosure. As shown in FIG. 4, the method for establishing a map model according to an embodiment of the present disclosure includes following steps.

In step S21, an unmanned aerial vehicle is controlled to take off. In an embodiment of the present disclosure, the unmanned aerial vehicle is controlled to take off in a manual control mode and to switch into an autonomous flight mode after flying for a period of time, if the unmanned aerial vehicle has a monocular camera; the unmanned aerial vehicle is controlled to take off in the autonomous control mode if the unmanned aerial vehicle has a stereo camera.

In step S22, videos of a scene corresponding to the unmanned aerial vehicle are collected at each collection time point, and a laser scanning is performed on the scene to obtain laser scanning data of the scene corresponding to each collection time point. Preferably, in an embodiment of the present disclosure, a collection frequency of collecting the videos of the scene corresponding to the unmanned aerial vehicle at each collection time point may be 30 frames per second.

In step S23, flight attitude parameters of the unmanned aerial vehicle at each collection time point are recorded, and feature points in the videos of the scene corresponding to each collection time point are obtained. In an embodiment of the present disclosure, the flight attitudes of the unmanned aerial vehicle are the Euclidean transformation of the unmanned aerial vehicle with respect to the initial location, and these flight attitude parameters consist of three rotation angles and three displacements.

In step S24, a flight path of the unmanned aerial vehicle is generated according to the feature points in the videos of the scene corresponding to each collection time point.

In step S25, a first map model is generated according to the flight path of the unmanned aerial vehicle and the videos of the scene corresponding to each collection time point.

In step S26, a second map model is generated according to the flight attitude parameters, the first map model and the laser scanning data. In an embodiment of the present disclosure, a precision of the second map model is higher than that of the first map model.

As shown in FIG. 4, in this embodiment of the present disclosure, the first map model of the scene is obtained by controlling the unmanned aerial vehicle to fly in the autonomous mode, and the laser scanning data is obtained by performing the laser scanning on the scene, such that the second map model is generated according to the laser scanning data and the first map model, thus establishing the map model with the high precision.

Figure 5:
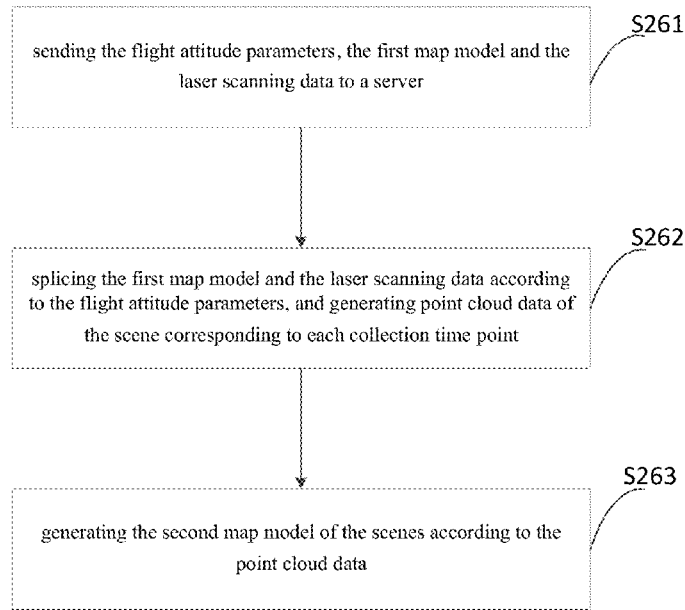
FIG. 5 is a flow chart showing generating a second map model according to flight attitude parameters, a first map model and laser scanning data in a method for establishing a map model according to an embodiment of the present disclosure.

FIG. 5 is a flow chart showing generating a second map model according to the flight attitude parameters, the first map model and the laser scanning data in a method for establishing a map model according to an embodiment of the present disclosure.

As shown in FIG. 5, in a specific embodiment of the present disclosure, step S26 includes following steps.

In step S261, the flight attitude parameters, the first map model and the laser scanning data are sent to a server.

In step S262, the first map model and the laser scanning data are spliced according to the flight attitude parameters, and point cloud data of the scene corresponding to each collection time point is generated. Preferably, in an embodiment of the present disclosure, for splicing the first map model and the laser scanning data according to the flight attitude parameters, relative location relationships between different data frames may be calculated by ICP algorithm firstly, and then the splicing and optimization may be completed by the Pose Graph optimization algorithm. In addition, in an embodiment of the present disclosure, the point cloud data of the scene corresponding to each collection time point includes three-dimensional coordinates of spatial points. By performing a perspective mapping on the camera images, the point cloud data may further include color information of the spatial points.

In step S263, the second map model of the scenes is generated according to the point cloud data. In an embodiment of the present disclosure, a three-dimensional surface grid in the scene may be calculated from the point cloud data by the point cloud triangulation algorithm. The three-dimensional surface grid may include the relative location information between the objects and the three-dimensional geometric structures in the scene, and thus may be used as the high-precision map model of the scene.

Figure 6:
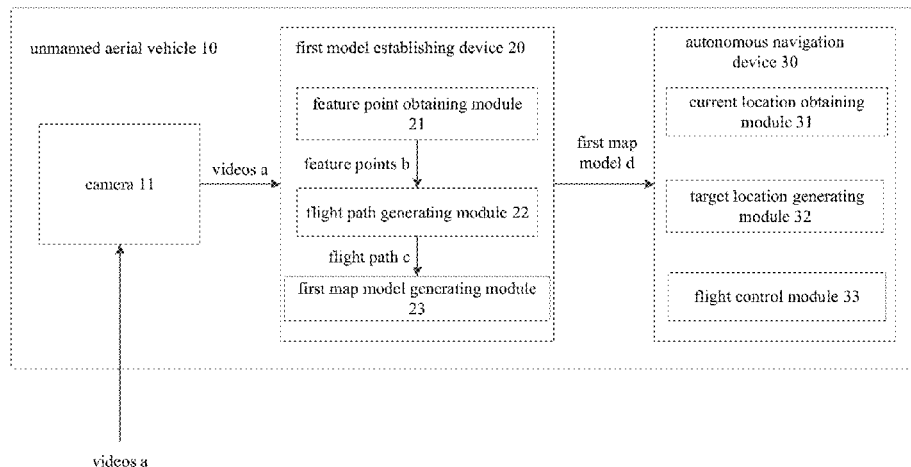
FIG. 6 is a schematic diagram illustrating an autonomous navigation system according to an embodiment of the present disclosure.

FIG. 6 is a schematic diagram illustrating an autonomous navigation system according to an embodiment of the present disclosure.

As shown in FIG. 6, the autonomous navigation system of the unmanned aerial vehicle 10 according to an embodiment of the present disclosure includes a camera 11, a first model establishing device 20 and an autonomous navigation device 30. The camera 11 is disposed on the unmanned aerial vehicle 10 and configured to collect videos a of a scene corresponding to the unmanned aerial vehicle 10 at each collection time point. The first model establishing device 20 is configured to obtain feature points b in the videos a of the scene corresponding to each collection time point, to generate a flight path c of the unmanned aerial vehicle 10 according to the feature points b, and to generate a first map model d according to the flight path c and the videos a of the scene corresponding to each collection time point. The autonomous navigation device 30 is configured to carry out autonomous navigation on the unmanned aerial vehicle 10 according to the first map model d.

In this embodiment of the present disclosure, by collecting the videos a of the scene corresponding to the unmanned aerial vehicle 10 each collection time point, and analyzing and identifying the videos a, the unmanned aerial vehicle 10 may carry out the autonomous navigation in the indoor environment.

In a specific embodiment of the present disclosure, the autonomous navigation device 30 specifically includes a current location obtaining module 31, a target location generating module 32 and a flight control module 33. The current location obtaining module 31 is configured to obtain a current location of the unmanned aerial vehicle 10 according to the first map model d. The target location generating module 32 is configured to obtain regions where the unmanned aerial vehicle 10 has not flied over in the scene according to the current location and a takeoff location of the unmanned aerial vehicle 10, and to generate the target location according to the first map model d and the regions where the unmanned aerial vehicle has not flied over in the scene. The flight control module 33 is configured to generate a navigation path according to the target location and the first map model d, and to control the unmanned aerial vehicle 10 to fly according to the navigation path.

Furthermore, in a specific embodiment of the present disclosure, the first model establishing device 20 specifically includes a feature point obtaining module 21, a flight path generating module 22 and a first map model generating module 23. The feature point obtaining module 21 is configured to obtain the feature points b in the videos a of the scene corresponding to each collection time point. The flight path generating module 22 is configured to generate a flight path of the unmanned aerial vehicle 10 according to the feature points b in the videos a of the scene corresponding to each collection time point. The first map model generating module 23 is configured to generate the first map model d according to the flight path c and the videos a of the scene corresponding to each collection time point.

Figure 7:
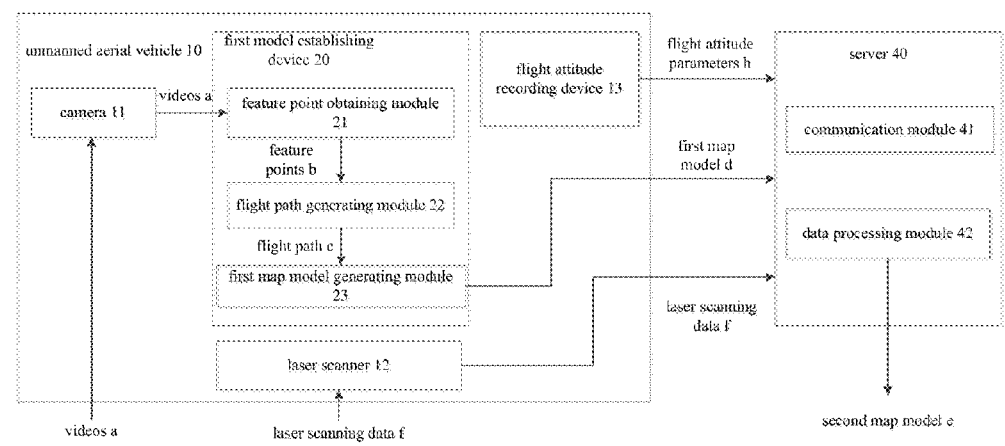
FIG. 7 is a schematic diagram illustrating a system for establishing a map model according to an embodiment of the present disclosure.

FIG. 7 is a schematic diagram illustrating a system for establishing a map model according to an embodiment of the present disclosure.

As shown in FIG. 7, a system for establishing a map model according to an embodiment of the present disclosure includes an unmanned aerial vehicle 10, a first model establishing device 20 and a server 40. The unmanned aerial vehicle 10 includes a camera 11, a laser scanner 12, and a flight attitude recording device 13. The camera 11 is disposed on the unmanned aerial vehicle 10 and configured to collect videos a of a scene corresponding to the unmanned aerial vehicle 10 at each collection time point. The laser scanner 12 is disposed on the unmanned aerial vehicle 10 and configured to perform a laser scanning on the scene corresponding to the unmanned aerial vehicle 10 at each collection time point. The flight attitude recording device 13 is disposed on the unmanned aerial vehicle 10 and configured to record flight attitude parameters h of the unmanned aerial vehicle 10 at each collection time point. The first model establishing device 20 is connected to the unmanned aerial vehicle 10 and configured to obtain feature points b in the videos a of the scene corresponding to each collection time point, to generate a flight path c of the unmanned aerial vehicle 10 according to the feature points b in the videos a of the scene corresponding to each collection time point, and to generate a first map model d according to the flight path c of the unmanned aerial vehicle and the videos a of the scene corresponding to each collection time point. The server 40 is configured to communicate with the unmanned aerial vehicle 10, and to generate a second map model e according to the flight attitude parameters h, the first map model d and the laser scanning data f.

In this embodiment of the present disclosure, the first map model d of the scene is obtained by controlling the unmanned aerial vehicle 10 to fly in the autonomous mode, and the laser scanning data f is obtained by performing the laser scanning on the scene, such that the second map model e is generated according to the laser scanning data f and the first map model d, thus establishing the map model with the high precision.

In an embodiment of the present disclosure, a precision of the first map model d is lower than that of the second map model e.

In a specific embodiment of the present disclosure, the first model establishing device 20 specifically includes a feature point b obtaining module, a flight path c generating module and a first map model d generating module. The feature point b obtaining module is configured to obtain the feature points b in the videos a of the scene corresponding to each collection time point. The flight path c generating module is configured to generate a flight path c of the unmanned aerial vehicle 10 according to the feature points b in the videos a of the scene corresponding to each collection time point. The first map model d generating module is configured to generate the first map model d according to the flight path c of the unmanned aerial vehicle and the videos a of the scene corresponding to each collection time point.

Furthermore, in a specific embodiment of the present disclosure, the server 40 specifically includes a communication module 41 and a data processing module 42. The communication module 41 is configured to receive the flight attitude parameters h, the first map model d and the laser scanning data f sent by the unmanned aerial vehicle 10; the data processing module 42 is configured to splice the first map model d and the laser scanning data f according to the flight attitude parameters h, to generate point cloud data of the scene corresponding to each collection time point, and to generate the second map model e of the scene according to the point cloud data.

In order to realize embodiments described above, the present disclosure also provides a system, including: one or more processors; a memory; and one or more modules, in which the one or more modules are stored in the memory, and when executed by the one or more processors, causes the one or more processors to perform following operations:

S101', the unmanned aerial vehicle is controlled to take off and videos of a scene corresponding to the unmanned aerial vehicle are collected at each collection time point.

S102', feature points in the videos of the scene corresponding to each collection time point are obtained.

S103', a flight path of the unmanned aerial vehicle is generated according to the feature points in the videos of the scene corresponding to each collection time point.

S104', a first map model is generated according to the flight path of the unmanned aerial vehicle and the videos of the scene corresponding to each collection time point.

S105', autonomous navigation on the unmanned aerial vehicle is carried out according to the first map model.

In order to realize embodiments described above, the present disclosure also provides a system, including: one or more processors; a memory; and one or more modules, in which the one or more modules are stored in the memory, and when executed by the one or more processors, causes the one or more processors to perform following operations:

S201', an unmanned aerial vehicle is controlled to take off.

S202', videos of a scene corresponding to the unmanned aerial vehicle are collected at each collection time point, and a laser scanning is performed on the scene to obtain laser scanning data of the scenes corresponding to each collection time point.

S203', flight attitude parameters of the unmanned aerial vehicle at each collection time point are recorded.

S204', feature points in the videos of the scene corresponding to each collection time point are obtained.

S205', a flight path of the unmanned aerial vehicle is generated according to the feature points in the videos of the scene corresponding to each collection time point.

S206', a first map model is generated according to the flight path of the unmanned aerial vehicle and the videos of the scene corresponding to each collection time point.

S207', a second map model is generated according to the flight attitude parameters, the first map model and the laser scanning data.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An autonomous navigation method of an unmanned aerial vehicle, comprising:
controlling the unmanned aerial vehicle to take off and collecting videos of a scene corresponding to the unmanned aerial vehicle at each collection time point;
obtaining feature points in the videos of the scene corresponding to each collection time point;
generating a flight path of the unmanned aerial vehicle according to the feature points in the videos of the scene corresponding to each collection time point;
generating a first map model according to the flight path of the unmanned aerial vehicle and the videos of the scene corresponding to each collection time point; and
carrying out autonomous navigation on the unmanned aerial vehicle according to the first map model;
wherein controlling the unmanned aerial vehicle to take off comprises:
controlling the unmanned aerial vehicle to take off in a manual control mode, if the unmanned aerial vehicle has a monocular camera;
controlling the unmanned aerial vehicle to take off in an autonomous control mode, if the unmanned aerial vehicle has a stereo camera.

2. The method according to claim 1, wherein carrying out autonomous navigation on the unmanned aerial vehicle according to the first map model comprises:
obtaining a current location of the unmanned aerial vehicle according to the first map model;
obtaining regions where the unmanned aerial vehicle has not flown over in the scene according to the current location and a takeoff location of the unmanned aerial vehicle;
generating a target location according to the first map model and the regions where the unmanned aerial vehicle has not flown over in the scene;
generating a navigation path according to the target location and the first map model, and controlling the unmanned aerial vehicle to fly according to the navigation path.

3. The method according to claim 1, wherein generating a flight path of the unmanned aerial vehicle according to the feature points in the videos of the scene corresponding to each collection time point comprises:
setting the takeoff location of the unmanned aerial vehicle as an initial coordinate;
generating each location coordinate of the unmanned aerial vehicle at each collection time point by comparing the feature points in the videos of the scene corresponding to each collection time point and using the initial coordinate as a reference;
generating the flight path of the unmanned aerial vehicle according to each location coordinate and the initial coordinate.

4. A method for establishing a map model, comprising:
controlling an unmanned aerial vehicle to take off;
collecting videos of a scene corresponding to the unmanned aerial vehicle at each collection time point, and performing a laser scanning on the scene to obtain laser scanning data of the scene corresponding to each collection time point;
recording flight attitude parameters of the unmanned aerial vehicle at each collection time point;
obtaining feature points in the videos of the scene corresponding to each collection time point;
generating a flight path of the unmanned aerial vehicle according to the feature points in the videos of the scene corresponding to each collection time point;
generating a first map model according to the flight path of the unmanned aerial vehicle and the videos of the scene corresponding to each collection time point;
generating a second map model according to the fight attitude parameters, the first map model and the laser scanning data;
wherein controlling the unmanned aerial vehicle to take off comprises:

controlling the unmanned aerial vehicle to take off in a manual control mode, if the unmanned aerial vehicle has a monocular camera;

controlling the unmanned aerial vehicle to take off in an autonomous control mode, if the unmanned aerial vehicle has a stereo camera.

5. The method according to claim 4, wherein a precision of the second map model is higher than that of the first map model.

6. The method according to claim 4, wherein generating a flight path of the unmanned aerial vehicle according to the feature points in the videos of the scene corresponding to each collection time point comprises:

setting a takeoff location of the unmanned aerial vehicle as an initial coordinate;

generating each location coordinate of the unmanned aerial vehicle at each collection time point by comparing the feature points in the videos of the scene corresponding to each collection time point and using the initial coordinate as a reference;

generating the flight path of the unmanned aerial vehicle according to each location coordinate and the initial coordinate.

7. The method according to claim 4, wherein generating a second map model according to the flight attitude parameters, the first map model and the laser scanning data comprises:

sending the flight attitude parameters, the first map model and the laser scanning data to a server;

splicing the first map model and the laser scanning data according to the flight attitude parameters, and generating point cloud data of the scene corresponding to each collection time point; and generating the second map model of the scene according to the point cloud data.

8. An autonomous navigation system of an unmanned aerial vehicle, comprising:

a camera, disposed on the unmanned aerial vehicle and configured to collect videos of a scene corresponding to the unmanned aerial vehicle at each collection time point, wherein, the camera comprises at least one of a monocular camera and a stereo camera, if the camera is the monocular camera, the unmanned aerial vehicle is controlled to take off in a manual control mode, and if the camera is the stereo camera, the unmanned aerial vehicle is controlled to take off in an autonomous control mode;

a first model establishing device, configured to obtain feature points in the videos of the scene corresponding to each collection time point, to generate a flight path of the unmanned aerial vehicle according to the feature points, and to generate a first map model according to the flight path and the videos of the scene corresponding to each collection time point; and an autonomous navigation device, configured to carry out autonomous navigation on the unmanned aerial vehicle according to the first map model.

9. The system according to claim 8, wherein the autonomous navigation device comprises:

one or more processors;
a memory; and
one or more modules, stored in the memory, and when executed by the one or more processors, causes the one or more processors to perform following operations:
obtaining a current location of the unmanned aerial vehicle according to the first map model;

obtaining regions where the unmanned aerial vehicle has not flown over in the scene according to the current location and a takeoff location of the unmanned aerial vehicle, and generating a target location according to the first map model and the regions where the unmanned aerial vehicle has not flown over in the scene;

generating a navigation path according to the target location and the first map model, and controlling the unmanned aerial vehicle to fly according to the navigation path.

10. The system according to claim 8, wherein the first model establishing device comprises:

one or more processors;
a memory; and
one or more modules, stored in the memory, and when executed by the one or more processors, cause the one or more processors to perform following operations:
obtaining the feature points in the videos of the scene corresponding to each collection time point;
generating the flight path of the unmanned aerial vehicle according to the feature points in the videos of the scene corresponding to each collection time point;
generating the first map model according to the flight path and the videos of the scene corresponding to each collection time point.

11. A system for establishing a map model, comprising:
an unmanned aerial vehicle, comprising:
a camera, disposed on the unmanned aerial vehicle and configured to collect videos of a scene corresponding to the unmanned aerial vehicle at each collection time point;
a laser scanner, disposed on the unmanned aerial vehicle and configured to perform a laser scanning on the scene corresponding to the unmanned aerial vehicle at each collection time point, wherein the camera comprises at least one of a monocular camera and a stereo camera, if the camera is the monocular camera, the unmanned aerial vehicle is controlled to take off in a manual control mode, and if the camera is the stereo camera, the unmanned aerial vehicle is controlled to take off in an autonomous control mode; and
a flight attitude recording device, disposed on the unmanned aerial vehicle and configured to record flight attitude parameters of the unmanned aerial vehicle at each collection time point;
a first model establishing device, connected to the unmanned aerial vehicle and configured to obtain feature points in the videos of the scene corresponding to each collection time point, to generate a flight path of the unmanned aerial vehicle according to the feature points in the videos of the scene corresponding to each collection time point, and to generate a first map model according to the flight path of the unmanned aerial vehicle and the videos of the scene corresponding to each collection time point; and
a server, configured to communicate with the unmanned aerial vehicle, and to generate a second map model according to the fight attitude parameters, the first map model and laser scanning data.

12. The system according to claim 11, wherein a precision of the first map model is lower than that of the second map model.

13. The system according to claim 11, wherein the first model establishing device comprises:
one or more processors;

a memory; and one or more modules, stored in the memory, and when executed by the one or more processors, cause the one or more processors to perform following operations:

obtaining the feature points in the videos of the scene corresponding to each collection time point;

generating the flight path of the unmanned aerial vehicle according to the feature points in the videos of the scene corresponding to each collection time point;

generating the first map model according to the flight path and the videos of the scene corresponding to each collection time point.

14. The system according to claim 11, wherein the server comprises:

one or more processors;

a memory; and one or more modules, stored in the memory, and when executed by the one or more processors, cause the one or more processors to perform following operations:

receiving the flight attitude parameters, the first map model and the laser scanning data sent by the unmanned aerial vehicle; and splicing the first map model and the laser scanning data according to the flight attitude parameters, generating point cloud data of the scene corresponding to each collection time point, and generating the second map model of the scene according to the point cloud data.

\* \* \* \* \*